United States Patent [19]
Woten et al.

[11] Patent Number: 5,788,163
[45] Date of Patent: Aug. 4, 1998

[54] INSULATION SPRAYING APPARATUS AND PROCESS

[75] Inventors: Homer Glenn Woten, 912 Perrin Ave., NW., Winter Haven, Fla. 33881; Everett S. Williston, Winter Haven; Joseph E. Rodriguez, Aburndale, both of Fla.

[73] Assignee: Homer Glenn Woten, Winter Haven, Fla.

[21] Appl. No.: 709,861

[22] Filed: Sep. 10, 1996

[51] Int. Cl.$^6$ .......................... B65G 53/48; B65G 69/06
[52] U.S. Cl. .......................... 239/654; 239/656; 239/668; 406/52
[58] Field of Search .......................... 239/650, 654–656, 239/668, 124; 406/52, 109, 117, 118, 120, 122, 127, 128, 130, 135, 151, 181

[56] References Cited

U.S. PATENT DOCUMENTS

| | | | |
|---|---|---|---|
| 1,781,097 | 11/1930 | Bonnot | 406/52 X |
| 4,162,766 | 7/1979 | Ten Broeck et al. | 239/656 |
| 4,296,695 | 10/1981 | Quanbeck | 239/655 X |
| 5,273,211 | 12/1993 | Pierce et al. | 239/656 |
| 5,403,128 | 4/1995 | Thomas | 406/39 |

*Primary Examiner*—Lesley D. Morris
*Attorney, Agent, or Firm*—Lalos & Keegan

[57] ABSTRACT

An insulation material spraying apparatus for using dry material and wet recycle material having, at least two hoppers for separately receiving the materials, at least one auger for receiving the materials for conveyance longitudinally of the auger, an accumulator chamber for receiving the materials and having at least one mixer rotatable about an axis for separately mixing and expanding the volume of the materials, a flow stabilizer to form a mixture of the wet and dry material and a pneumatic transport for receiving and dispensing the mixed insulation material. A process of spraying a mixture of dry material and wet recycle material from a single pneumatic transport using a dry material hopper and a wet recycle hopper, separately conveying the materials to an accumulator chamber, separately mixing and expanding the volume of the dry and wet recycle materials, mixing the dry material and the wet recycle material together, directing the mixture of the dry material and the wet recycle material into a pneumatic transport, and then dispensing and spraying the mixture.

40 Claims, 6 Drawing Sheets

INSULATION SPRAYING APPARATUS AND PROCESS

FIELD OF THE INVENTION

The present invention relates generally to a material spraying apparatus and process for spraying insulation material. More particularly the present invention relates to the spraying of dry insulation material and wet recycle material in the same apparatus and through the same pneumatic transport. The field of the present invention also includes the apparatus and process for producing particulate insulation material from compact masses of dry or wet recycle insulation material to produce desirably mixed insulation materials when pneumatically blown or sprayed onto selected surfaces.

BACKGROUND OF THE INVENTION

The types of insulation materials which the present invention is concerned includes loose insulating material that is generally but not exclusively fibrous such as granulated rock wool, granulated mineral fiber wool, glass fiber materials, cellulose fibers, expanded mica, etc. This insulation material in particulate form may be either blown dry or sprayed through a nozzle preferably with liquid added to form an insulating and sealing coating on any surface. This insulation material has been blown on conventional walls and ceilings, places of habitation or working areas. It also may be sprayed in mine shafts, tunnels and the like. The insulating material used in conventional insulation spraying and blowing machines is desirable in a relatively loose condition but being packed under high compression in bags or sacks for shipment to the user, these bags upon being opened usually yield compressed masses of the insulation that makes it very difficult for conventional apparatus to use this insulation material.

The separation of the large masses of insulating material to form particulate materials has been a problem that was met and solved as disclosed in Woten U.S. Pat. No. 4,411,390 issued Oct. 25, 1983 as well as related U.S. Pat. Nos. 3,085,834 and 3,529,870 which relate to insulation blowing machines that have successfully reduced the compact masses to being particulate. As used hereinafter the term "particulate" must be understood to include not only particles but also one or more intertwined or overlapping fibers and for convenience the term "particulate material" will therefore include materials formed as particles as well as such fibers. Further, as used hereinafter the term "insulation material" will include all of those insulation materials disclosed above.

The Woten U.S. Pat. No. 4,411,390 was also concerned with producing a smooth flow of the material after it has been formed into a consistent density and then discharged from a pneumatic dispenser. This patented invention was successful in producing uniform particulate material and a uniform composition that was consistent and could be sprayed successfully on any surface.

The foregoing apparatus for spraying particulate insulation material has been successful in handling and spraying dry new insulation material nevertheless, a problem has arisen in attempting to utilize waste insulation material that either has been previously sprayed onto a surface or which has spilled or has been produced in excess and is to be removed. Such insulation material is in a wet condition and therefore has been typically found to be almost impossible to mix uniformly and spray again onto a desired surface.

Any attempt to combine the dry or new insulation material with a wet recycle insulation material typically has caused clogging or lumps that prevented a uniform flow and dispensing of the combination of the wet recycle insulation material with the dry insulation material. This problem has been approached and sought to be attended to by attempting to combine the dry and the wet recycle material and have them both sprayed together. Such an effort is presented in U.S. Pat. No. 5,403,128 issued to Bruce Thomas on Apr. 4, 1995.

As disclosed, this patented system includes the pickup of the waste insulation by a vacuum and the transportation of it to a cyclone separator from which the insulation drops into a standby chamber and then is blown from a first airlock into a second airlock. The new insulation, however, is never mixed with the waste or wet recycle insulation material until it is introduced into the second airlock still separated from the wet waste insulation material. The dry cellulose material is moved by gravity through a gated opening into the same airlock apparatus but still separated from the wet recycle material. The result is that the wet recycle material and the dry material are never evenly mixed even though they are ultimately sprayed out through a single outlet. Therefore the problem of mixing to a uniform consistency the wet recycle material with the dry material has not been solved and the combination of the wet and dry materials has never been effectively used to the satisfaction of those skilled in the art.

Accordingly, it is the principal object of the present invention to provide apparatus and the method for combining wet recycle material with dry material to form a uniform mixture prior to dispensing these insulation materials through a pneumatic transport.

It is a further object of the present invention to provide an apparatus and method for treating separately wet recycle material and dry material and metering these insulation materials individually and separately into a mixing chamber that mixes the wet recycle material and the dry material into a uniform mixture of consistent composition and then propel this mixture into a pneumatic transport for dispensing and spraying.

A further object of the present invention is to treat the wet recycle material and the dry material individually and separately by conveying them individually and separately to an accumulator chamber where they are individually separately mixed to expand the volume of these materials individually and then to meter them to a flow stabilizer where the wet recycle material is combined for the first time with the dry material to form a uniform mixture that is then propelled into the pneumatic transport from whence it is dispensed in a hose onto a desired surface.

A further and more particular object of the present invention is the provision of a centrifugal vacuum fan for vacuuming the waste wet material for recycling into the spraying machine of the present invention.

It is also the object of the present invention to provide a vacuum fan of unique shape of the fan blades to provide a suction area for uniform and efficient vacuuming of the waste wet material for recycling which does not clog or cause a stagnation of the material and is capable of providing a vacuum of several psi.

These and other objects of the present invention will be manifest upon consideration of the following summary of the invention, the drawings and the detailed description of the preferred embodiment along with the appended claims.

SUMMARY OF THE INVENTION

A process and apparatus for spraying insulation material derived from dry insulation material and wet recycle insulation material using at least two hoppers for separately receiving these materials, at least one auger rotatably positioned below each hopper for receiving the materials for conveyance longitudinally of the auger, an accumulator chamber positioned below the auger for receiving the materials and having at least one mixer rotatable about an axis and having a plurality of contacts extending outwardly relative to said axis for separately mixing and expanding the volume of said materials, a flow stabilizer to combine together the dry material and the wet recycle material to form a mixture of the wet and dry material and a pneumatic transport positioned below the accumulator chamber for receiving and dispensing the mixed insulation material.

This invention also includes a centrifugal vacuum fan for vacuuming waste wet insulation material for recycling to a spraying machine having a drive shaft for rotating the vacuum fan and an inlet to said fan, a plurality of fan blades secured to said shaft at the root of each of the blades distal to upstream of the flow of material and the leading edge of the blades, each said blade being cut away between the leading edge of the blade and said root to form a blade throat with a suction area and the leading blade edge extending beyond the end of the shaft to increase the suction area.

DESCRIPTION OF THE PREFERRED EMBODIMENT

Figure 1:
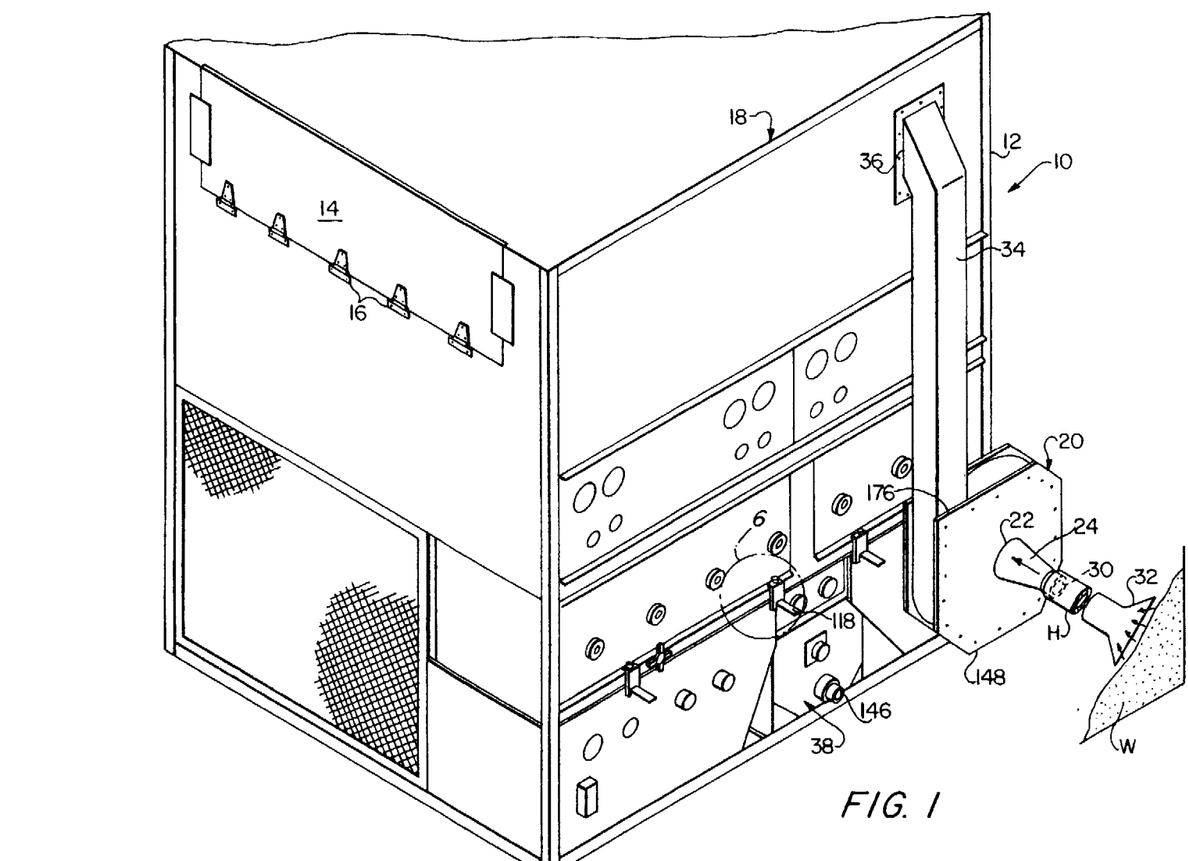
FIG. 1 is a perspective view partly broken away illustrating the spraying apparatus of the present invention including the vacuum feature of waste wet material that is sucked up through the recycle exit chute and into the spraying apparatus.
Figures 14, 15:
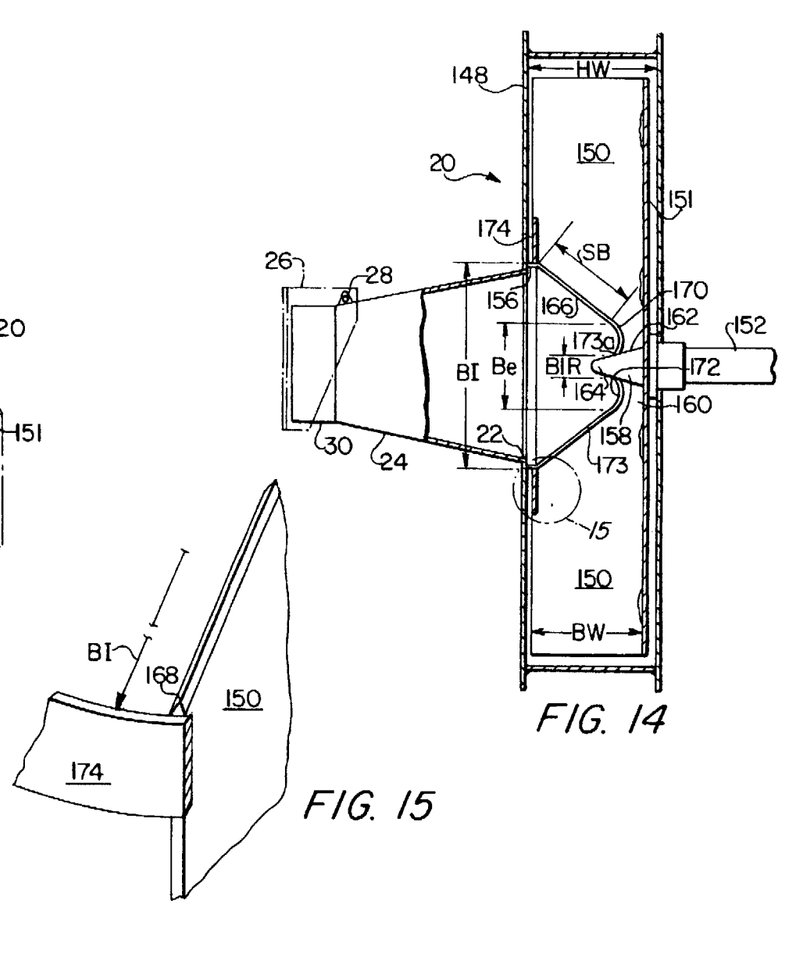
FIG. 14 is a side elevational view of the vacuum fan of FIG. 13, the rotor fan blade and the fan blade root, the straight blade transition to the fillet radius and the drive shaft conical stub along with the blade support structural ring and the fixed inlet ring.
FIG. 15 is a fragmentary view enlarged as taken within the circle of FIG. 14 illustrating the impeller inlet ring and a portion of the blade.

The apparatus of the present invention is depicted generally at 10 and includes a housing 12 having on one side a drop gate 14 that pivots outwardly on hinges 16 for loading dry material into the dry material hopper to be described hereinafter. On the front side of the housing 12 may be seen several of the elements of the present invention including a vacuum fan 20 having an inlet at 22 to which is attached a short tubular extension 24 that has a swivel door 26 positioned at the end as shown in FIG. 14 and pivoted about swivel rod 28 secured to the extension tube 24. The swivel door 26 secures the hose inlet 30 to an operative condition. When opened, a length of hose H is secured to inlet 30 shown in FIG. 1. This vacuum hose H is preferably about 4 inches diameter and is preferably not less than 150 feet nor more than 200 feet long and at the end of which is a scrubbing tool 32, which is shown in FIG. 1 applied to waste material W. This waste material W is then sucked up through the scrubbing tool 32 and the vacuum hose H into the vacuum fan 20 whereupon it is conveyed through vacuum exit tube 34 to be passed back into the apparatus 10 through the housing 12 by means of the opening 36 therein.

An important feature of the present invention is the ability of the present apparatus to accept both dry material and recycle material that is usually wet and use both the dry and the wet recycle material for application to other surfaces. As will be clearly shown in the further description of this invention, the dry material and the wet recycle material are kept separate and independent of each other until mixed just prior to the entrance into the pneumatic transport that is in the form of a conventional double drum air lock feeder 38.

Figure 2:
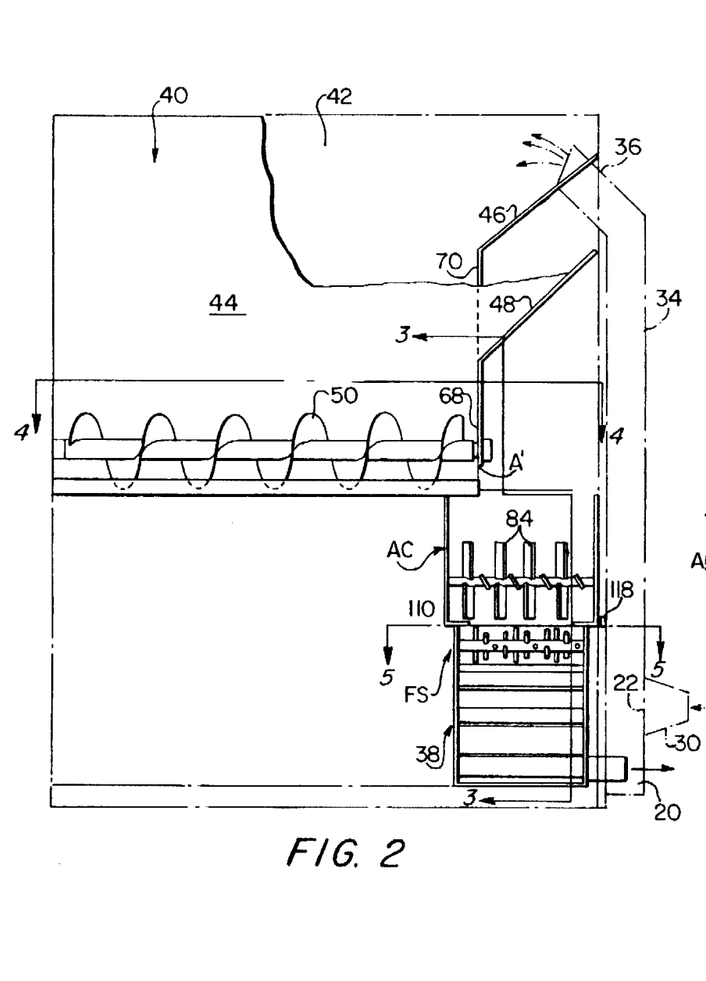
FIG. 2 is a side elevational view partly broken away illustrating both the recycle material hopper and the dry material hopper and one of the augers positioned below the hopper for receiving the dry material and moving it into the accumulator chamber where it is individually mixed and then into the flow stabilizer wherein the rotating bars having radial fingers are shown to propel the mixed material into the air lock feeder.

In its general operation, the dry material is loaded through the drop gate 14 into the dry hopper 40 while at the same time the wet recycle material is vacuumed by the centrifugal vacuum fan 20 up through the vacuum exit chute 34 through the housing opening 36 into the wet recycle hopper 42 that is separated from the dry material hopper 40 by wall 44. In FIG. 2 it may be seen that the front wall 46 of the recycle hopper is sloped to accept the material from the vacuum exhaust chute. In comparison the front wall 48 of the new or dry material hopper is much lower in order to provide greater volume capability within the dry material hopper.

Figure 3:
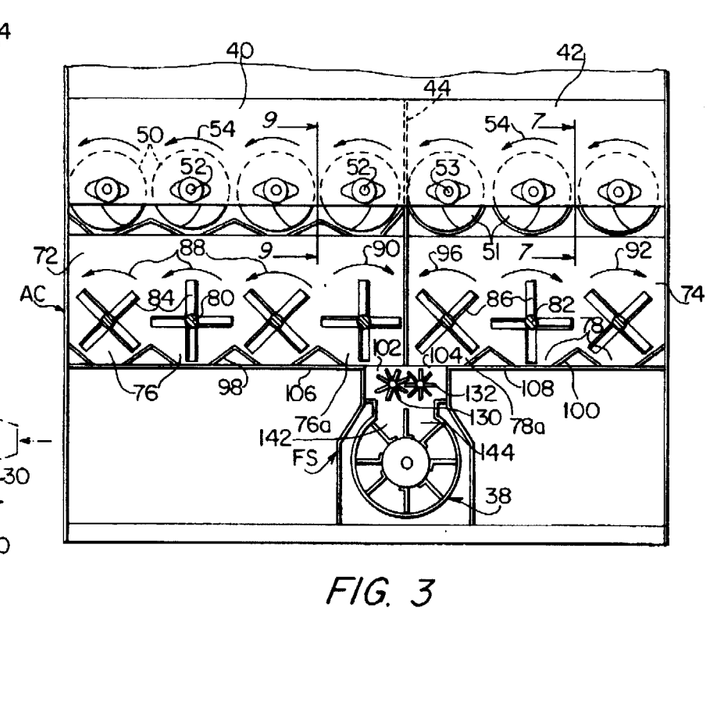
FIG. 3 is a front elevation partly broken away illustrating the hopper augers receiving new or dry material on the left and the recycle material on the right and their rotation within their respective troughs for conveying the materials through the metering slot shown into the accumulating chamber having the bars rotating on shafts that mix separately the new material and the recycle material and propel it through the slide gate into the flow stabilizer where the new and recycle material are mixed for the first time and passed into the double drum air lock feeder below.

At the bottom of the respective hoppers as best shown in FIGS. 2 and 3 is a plurality of hopper augers 50 and 51. As shown particularly in FIG. 3 there are four dry material hopper augers 50 each rotating about horizontal axes 52 and three recycle material hopper augers each rotating about axes 53. Each of the hopper augers rotate in a counterclockwise direction as shown by the arrows 54. Because more of the dry material is utilized compared to the wet recycle material the dry hopper 40 is larger than the recycle hopper 42. Accordingly, there are preferably, though not necessarily, more augers at the bottom of the dry material hopper compared to the number in the recycle material hopper. As can be seen from FIGS. 2 and 4 each dry hopper auger 50 and each recycle hopper auger 51 extends the full length of their respective hoppers 40 and 42 but each of these hopper augers rotates within its own troughs 56 and 58 for the dry material hopper auger and the recycle hopper auger respectively.

As best shown in FIGS. 7 through 10, the trough 56 for dry material hopper does not require a close spacing from the periphery of the auger 50 because the dry material does not clog nor do the fibers stick together as do the wet recycle material. Accordingly the spacing between the periphery of the auger 50 and the trough 56 can be approximately about at least ¼ inch to 1 inch though the spacing is not critical. While the shape of the dry material hopper trough 56 is shown to be angular this shape is not crucial and can be partially polygonal as shown. The recycle hopper trough 58, however, must have a closer spacing of about ⅛ to ⅜ of an inch between the periphery of the auger 51 and the surface of the recycle hopper trough 58. It is also preferable that the recycle hopper trough 58 extend substantially in a continuous semicircular circle about 0.33 to 0.5 of the circumference of the recycle hopper auger 51.

Figure 4:
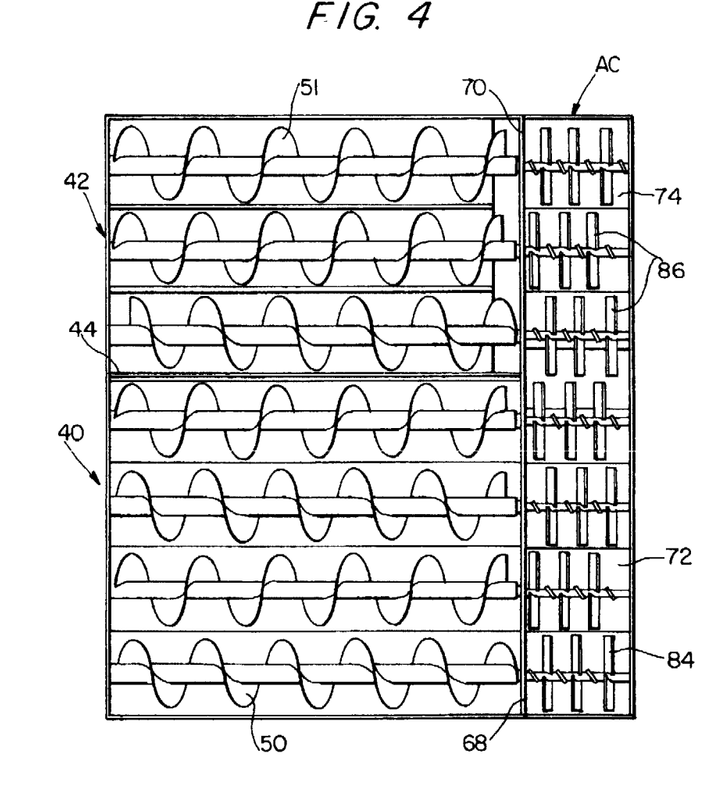
FIG. 4 is a cross-sectional view taken along lines 4—4 of FIG. 2 illustrating the flights of the augers and the accumulator mixers below.
Figure 7:
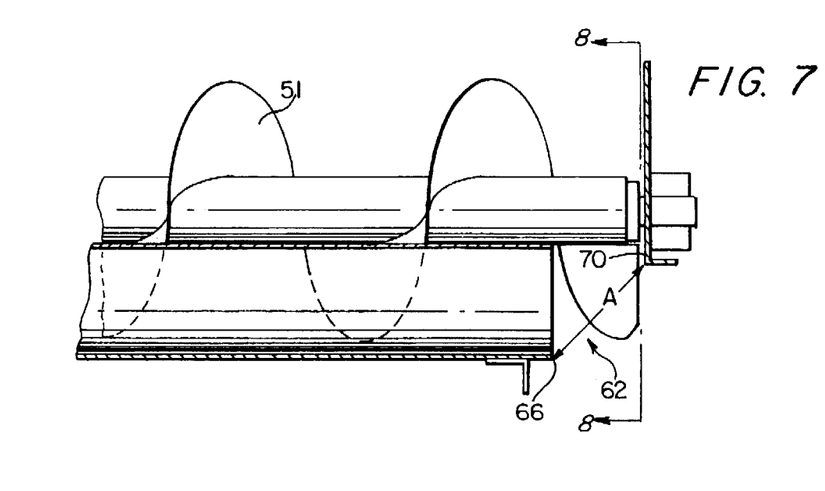
FIG. 7 is a cross-sectional view, taken along lines 7—7 of FIG. 3 and partly broken away and illustrating a portion of the auger flight and the metering slot for the recycle material.
Figure 8:
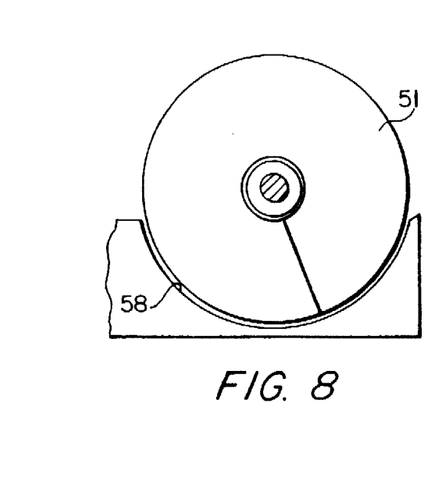
FIG. 8 is a cross-sectional view partly broken away taken along lines 8—8 of FIG. 7 showing the auger for conveying the recycle material rotating within its trough.
Figure 9:
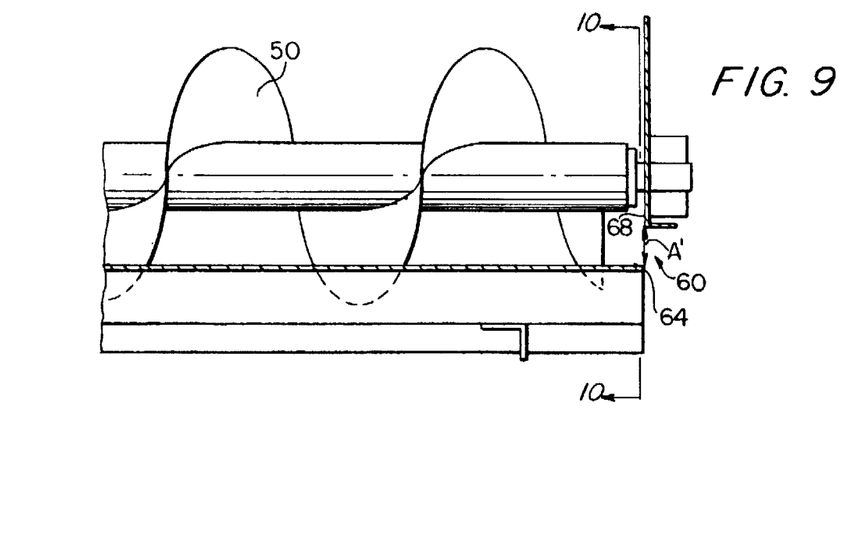
FIG. 9 is a cross-sectional view taken along lines 9—9 of FIG. 3 and partly broken away illustrating a portion of the auger flight of the new or dry material and the corresponding metering slot.
Figure 10:
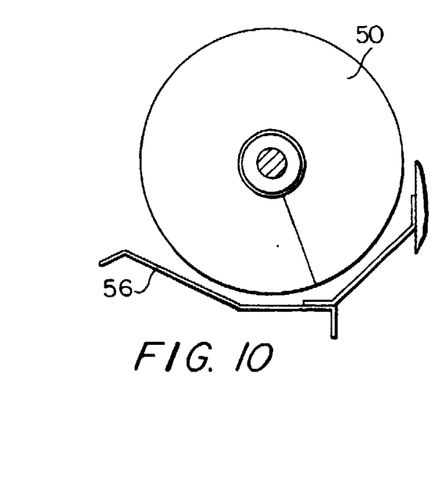
FIG. 10 is a cross-sectional view taken along lines 10—10 and partly broken away illustrating the trough within which the new material auger rotates.

The dry material in the dry material hopper 40 and the recycle material in the recycle hopper 42 are conveyed by the respective hopper augers 50 and 51 as previously stated. However the length of the respective troughs are not the same as shown in FIGS. 4, 7 and 9. This length differential in the trough produces metering slots shown as the dry metering slot 60 and the recycle metering slot 62. The dry metering slot 60 and the recycle metering slot 62 are formed as the spacing between the ends 64 and 66 of the dry material auger trough 56 and the recycle material auger trough 58 respectively and the respective ends 68 and 70 of their corresponding dry hopper and recycle hopper end walls.

The metering slots extend across the entire width at the bottom of each of their respective hoppers 40 and 42 and are sized to contain the dry material and the recycle material until further processed for delivery by the augers 50 and 51. It has been found that the dry material comes off the augers 50 differently than the wet or damp recycle material comes off the recycle augers 51. Accordingly, the metering slots 60 and 62 are preferably of different sizes. It has been found that the recycle material metering slot 62 should be approximately about one and a half times the width of the dry material metering slot 60 as shown by the measurements in FIGS. 7 and 9 at A and A'. The dry material and the recycle material are still kept separate from each other and pass through the metering slots into the accumulator chamber as best shown in FIGS. 2, 3 and 4. The accumulator chamber is designed to fluff and otherwise increase the volume of the dry material and the recycle material. Additionally, the accumulator chamber serves as a surge chamber to provide consistency in flow between the auger feed rate and the exiting from the accumulator chamber.

The accumulator chamber is provided with two sections, a dry material section 72 and a recycle material section 74. The dry material section 72 is provided with a plurality of mixers 76 and 76a. The number of dry mixers 76 or 76a corresponds to the number of dry augers 50 and likewise the number of recycle mixers 78 and 78a corresponds to the number of recycle augers 51 though this number is not a critical aspect of the invention. As shown, the mixers 76 and 76a and 78 and 78a rotate about their respective axes 80 and 82 and are provided with radially extending bars or contacts 84 and 86.

As shown in FIG. 3, the mixers 76 in the dry material section 72 preferably rotate in the same counterclockwise direction as shown by the arrows 88, however inboard mixer 76a rotates in the opposite direction shown at 90 to be clockwise. Similarly in the recycle section 74 the mixers 78 rotate in clockwise direction as shown at 92 and the inboard mixer 78a closest to the dividing wall 44 rotates in a counterclockwise direction as shown at 96. The rotational directions of the respective mixers in the dry accumulator chamber 72 and the recycle accumulator chamber 74 are designed to generate the maximum mixing and as the two inboard mixers 76a and 78a rotate they sling their dry material and wet recycle material in their respective sections down along both sides of dividing wall 44 and out of the accumulator chamber AC. Troughs 98 and 100 are positioned respectively in the dry accumulator chamber 72 and the recycle accumulator chamber 74 beneath the rotating mixers. The mixers 76a and 78a are important in that the dry material and recycle material are forced out of their respective chambers by these inboard mixers through openings 102 and 104 in the floor 106 and 108. Each of these openings 102 and 104 in the dry material section 72 and the recycle material section 74 the accumulator chamber AC permit the dry and recycle material flow volume to be independently controlled as they both are propelled into the flow stabilizer shown as FS.

Figure 6:
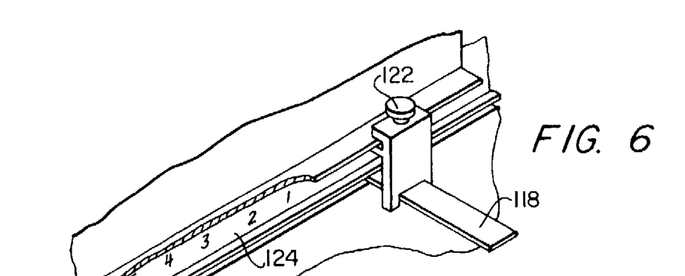
FIG. 6 is a broken away perspective view of the slide gate control as shown within the circle in FIG. 1 for the manual operation of the slide gates shown in FIG. 5.

An important feature of the present invention is the utilization of movable slide gates 110 and 112 to permit the independent control of the flow volume of the material. These slide gates are operable by pivoting bars 114 and 116 respectively and are able independently to selectively cover any portion of the dry material opening 102 or the recycle material opening 104 simply by independently moving the handles 118 and 120. As best shown in FIG. 6, the handle 118 and also handle 120 may be locked in place by their respective set screws 122. Also as shown there is a scale 124 to aid in positioning the slide gates. Each of the slide gates 110 and 112 are provided with an operating edge 126 and 128 respectively that will close off the selected portions of the openings 102 and 104.

The flow stabilizer FS is a significant element of the present invention in that it is in the flow stabilizer for the first time that the dry material and the recycle material are mixed together. The slide gates 110 and 112 serve the dual purposes of permitting this mixture to occur as well as determining the mixture ratio of the dry material and recycle material simply by opening or closing one of the slide gates 110 or 112 more than the other. The opening and closing of these slide gates would vary significantly in accordance with the speeds of the augers 50 and 51.

Figure 11:
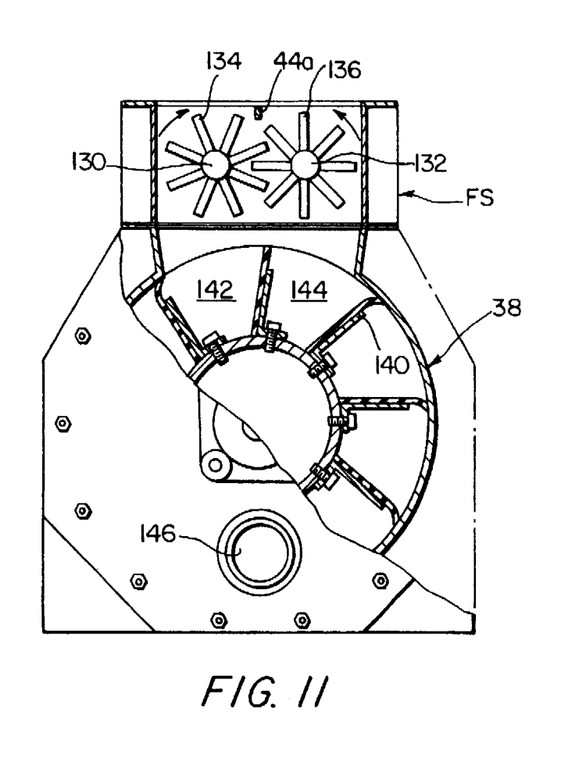
FIG. 11 is a front elevational view partly broken away of the conventional air lock feeder and the flow stabilizer with the counter rotating meshing fingers that propel the mixed dry material and wet recycle material into the air lock feeder.
Figure 12:
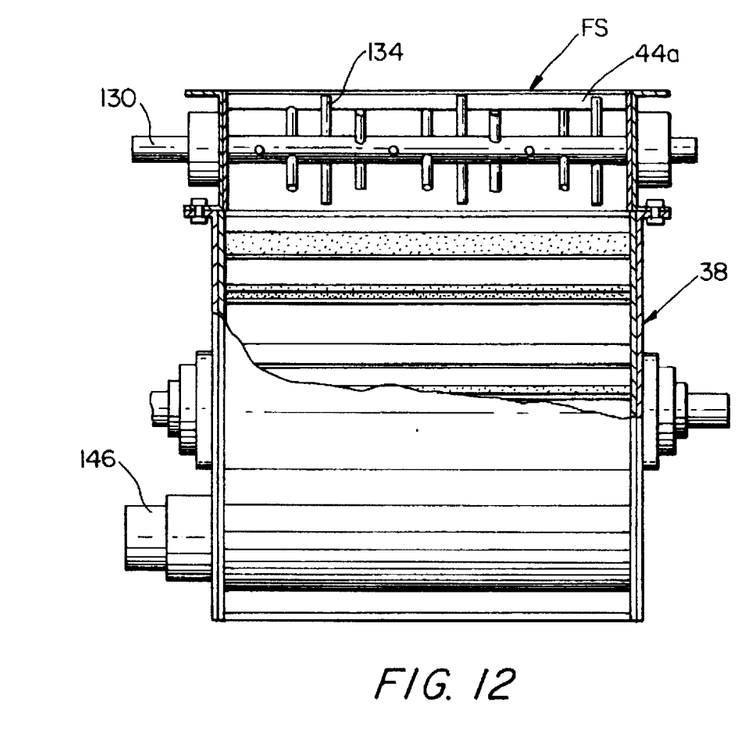
FIG. 12 is a side elevational view of the air lock feeder and flow stabilizer of FIG. 11 illustrating the rotating bar and the radially extending fingers and the air lock.

The flow stabilizer 75 is provided, as best shown in FIGS. 11 and 12 but also in FIGS. 2 and 3, with a pair of counterrotating bars 130 and 132 each bar having a plurality of radially extending fingers 134 and 136. These fingers overlap and mesh and can run at high speeds to not only mix the wet recycle material and the dry material together for the first time but also to direct the resulting mixture at substantial speed out of the flow stabilizer chamber FS into the conventional double drum air lock feeder 38. Wall 44 extends as shown at 44a, into the flow stabilizer chamber FS, in order to maintain separation of the wet and dry materials and prevent cross over of these materials.

Figure 5:
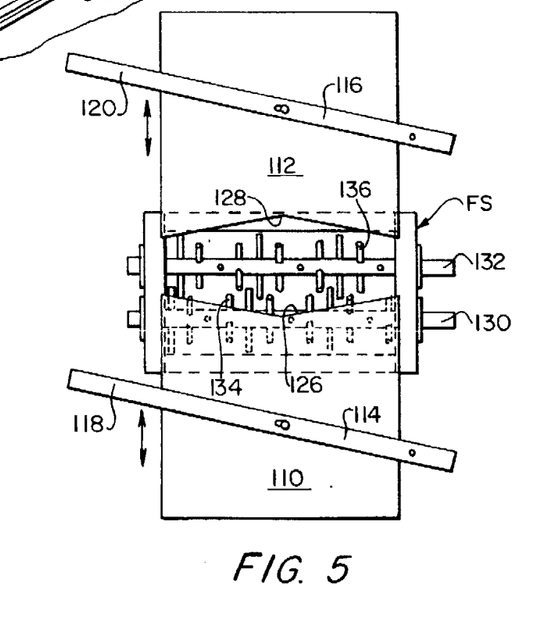
FIG. 5 is a cross-sectional view taken along lines 5—5 of FIG. 2 illustrating the metering slide gate that controls the individual flow of the new material and the recycle material into the flow stabilizer where the rotating fingers produce the uniform mixture.

FIGS. 11, 12 particularly as well as FIGS. 2, 3 and 5 depict the structure of the rotating bars 130 and 132 and meshing radially extending fingers 134 and 136 more clearly. As is conventional with an air lock feeder such as 38, vanes 140 rotate and form individual air lock compartments such as 142 and 144 that will individually and serially be coincident with outlet 146 upon rotation of the feeder so that the mixed dry material and wet recycle material are uniformly mixed and blown out through the outlet 146 to which is attached the usual hose (not shown). At the end of this hose is the typical spray nozzle also not shown. Water jets at such nozzle may further dampen the material as desired but form no part of the present invention.

As shown in FIG. 1, however, there is another aspect of the present invention in that waste insulation material W that may be scrubbed from the wall surface to which insulation material was previously sprayed is then desired to be recycled. The hose H is used to vacuum the waste insulation material W and suck it into the centrifugal vacuum fan 20 that is a part of the present invention.

Figure 13:
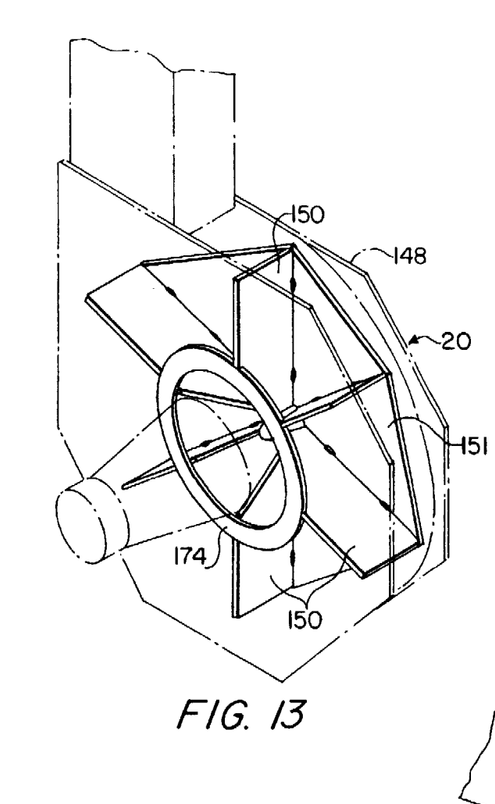
FIG. 13 is a perspective view partly broken away of the centrifugal vacuum fan showing the exhaust chute as well as the inlet to the vacuum fan.

The vacuum centrifugal fan 20 is an important element of the present invention and is shown in FIGS. 13 through 15. The fan 20 includes a housing 148 within which rotates a plurality of rotor fan blades 150 supported in part by a coextensive back plate 151 and radially extending from a shaft 152 that is rotated by means not shown. The housing is provided with a centrally located circular opening or inlet 22. Surrounding the inlet or opening 22 within the housing is a fixed inlet ring 156 secured to the inside of the housing and continuously surrounding opening 22. This fixed inlet ring 156 defines a diameter for the fan blade inlet or throat identified as BI, as shown in FIG. 14. BI is the maximum diameter for the rotor fan blade inlet to receive air under vacuum produced by the rotating fan blades 150. Secured to the opening 22 is extension 24 which is conical in shape and is provided at its end with a cylindrical extension inlet 30. Attached to the extension inlet 30 is a swivel door 26 secured in any suitable fashion by a swivel rod 28 positioned atop the extension inlet 24. The swivel door 26 pivots upwardly to permit the connection of hose H to retrieve the waste W for recycle.

The construction of the fan blades 150 and the end of the shaft 152 are important in contributing to the efficiency and effectiveness of the centrifugal vacuum fan 20, which can pull a vacuum of at least minus 2 psi. The shaft 152 is provided with a conical stub end 158 to which the fan blades 150 are secured to be distal to the upstream flow of material. As is apparent from FIG. 14, the root 160 of the fan blade 150 is narrowed considerably as compared to the blade width shown as BW. The blade root is attached to the conical stub 158 at 162 distal to the upstream flow of material entering the vacuum fan 20 and leaving about a third to a half of the conical portion of the conical stub 158 protruding as shown at 164.

The fan blade 150 rotates within the housing having an inside width shown as HW. But the significant aspect of the construction of the fan blade is the fact that a substantial portion of the leading edge 166 is straight as illustrated by the dimension SB showing the straight blade portion that extends towards inlet 22 and out to the leading end point 168, as shown in FIG. 15. The angle that the blade portion SB makes with the axis of shaft 152 may be about 34°–42° but preferably about 36°–400° and most preferably about 38° to form the outer portion of the blade throat suction area. A fillet radius 170 having a leading edge 172 is formed at the fan blade root 160. The length of straight section SB of the rotor blade 150 may be 80 to 90% or preferably 75 to 92½% and most preferably approximately about 85% of the full blade width BW.

The area from the intersection of the straight blade portion SB of blade 150 and the fillet radius 170 at 173 to the intersection at 173a of the fillet radius 170 with the conical stub 158 forms the inner portion of a blade throat suction area that is defined by the area of the blade root BR as shown in FIG. 14 so that the ratio of the area formed by the fan blade inlet BI to the area of the blade root BR is from 5:1 to 7:1 and preferably about 5.5:1 to 6.5:1. As an example, the blade root BR diameter if 2.95 inches yields an area of 6.83 square inches while the blade inlet BI diameter if at 7.19 inches yields an area of 40.60 square inches resulting in a ratio of 5.49.

The inner portion of the blade throat section area BR also has been found to form with the area BIR, formed within the area bounded by the intersection 173a, a relationship that is expressed as: area BR:area BIR is from about 14:1 to 20:1, preferably 16:1 to 18:1 and most preferably about 17:1. For example BR area may be about 6.8 and the BIR area 0.4.

As constructed it should be apparent that the drive shaft conical stub end 164 is sized to intersect the blade root fillet radius 170 so that there is a minimum of material stagnation upon vacuum being applied to the waste material W.

The fan blade 150 is supported and further strengthened by a blade support structural ring 174 as best shown in FIG. 15 but also shown in FIGS. 13 and 14. The blade support structural ring 174 has an internal diameter that is identical to the dimension BI. The outlet from the vacuum fan housing 148 is shown at 176 and leads into the vacuum exit chute 34 and then through opening 36 in housing 12 to enter the recycle material hopper as best shown in FIG. 2.

It should be manifest from the foregoing description that the waste material W enters the vacuum fan 20 and is deposited in the recycle material hopper 42. At the same time the bagged dry material hopper 40 is loaded through drop gate 14. The augers 50 and 51 move the dry material and the wet recycle material forwardly through the metering slots into the accumulator chamber AC where they are individually and independently mixed by mixers 76 and 78 and then propelled by mixers 76a and 78a into the flow stabilizer compartment FS where the counter rotating bars 130 and 132 and their intermeshing fingers 134.136 intimately mix the dry material and the wet recycle material together and propel it into the double drum air lock feeder 38 and out through outlet 146 to which is attached a conventional spray hose for application to the desired surfaces.

It should be manifest that the object of the invention are attained by reason of the foregoing description of the invention which should be limited in scope solely by the appended claims wherein we claim:

1. An insulation material spraying apparatus comprising:
   at least two hoppers for receiving insulation material,
   at least one auger rotatably positioned below each said hopper for receiving said material for conveyance longitudinally of said auger, an accumulator chamber positioned below said auger for receiving said material, said accumulator chamber containing at least one mixer rotatable about an axis and having a plurality of contacts extending outwardly relative to said axis for mixing and expanding the volume of said material, and a pneumatic transport positioned below said accumulator chamber for receiving and dispensing said material.

2. The apparatus of claim 1 including, said two hoppers including both a dry material hopper and a recycle material hopper, said apparatus also including a plurality of augers positioned below said hoppers.

3. The apparatus of claim 2 including, said plurality of augers including at least one dry material hopper auger and at least one recycle material hopper auger positioned below each of said dry hopper and recycle hopper respectively.

4. The apparatus of claim 3 including, said accumulator chamber including a dry material accumulator chamber and a recycle material accumulator chamber positioned respectively below each said hopper and each said accumulator chamber being provided with a plurality of rotatable mixers.

5. The apparatus of claim 4 including, a first metering slot communicating the dry material hopper auger with the dry material accumulator chamber therebelow and a second metering slot communicating the recycle material hopper auger with the recycle material accumulator.

6. The apparatus of claim 3 including, said dry material hopper auger rotatable within a trough spaced therefrom said dry material hopper auger at least about 0.25 to 1.0 inches.

7. The apparatus of claim 3 including, said recycle material auger being rotatable within a trough and spaced therefrom at approximately about 0.125 to 0.375 inches.

8. The apparatus of claim 7 including, said trough extending approximately about 0.33 to 0.5 circumferentially about said recycle material auger.

9. The apparatus of claim 1 including, a flow stabilizer positioned below said accumulator chamber in material communication therewith and said pneumatic transport therebelow for receiving and mixing said material prior to entering said pneumatic transport.

10. The apparatus of claim 9 including, said flow stabilizer having at least a pair of rotating bars with each said bar having mutually meshing fingers extending outwardly relative to the rotational axes of said bars.

11. The apparatus of claim 9 including, said hoppers including both a dry material hopper and a recycle material hopper, a plurality of augers positioned below said hoppers, and a variable opening positioned between both said dry material accumulator chamber and said recycle material accumulator for controlled material communication between said accumulator chambers and said flow stabilizer.

12. The apparatus of claim 11 including, said variable opening being a movable slide that selectively controls the flow of dry material and recycle material from their respective accumulator chambers into the flow stabilizer.

13. The apparatus of claim 12 including, said movable slide being positioned for selective operation to control the flow of said dry and recycle materials independently.

14. The apparatus of claim 1 including, said hoppers including both a dry material hopper and a recycle material hopper, a plurality of augers positioned below said hoppers, and a flow stabilizer positioned below said accumulator chamber in material communication therewith and said pneumatic transport therebelow for receiving and mixing said material prior to entering said pneumatic transport.

15. The apparatus of claim 1 including, said hoppers including both a dry material hopper and a recycle material hopper, a plurality of augers positioned below said hoppers, at least one dry material hopper auger and at least one recycle material hopper auger positioned below each of said dry hopper and recycle hopper respectively, and a flow stabilizer positioned below said accumulator chamber in material communication therewith and said pneumatic transport therebelow for receiving and mixing said material prior to entering said pneumatic transport.

16. The apparatus of claim 1 including, said hoppers including both a dry material hopper and a recycle material hopper, a plurality of augers positioned below said hoppers, at least one dry material hopper auger and at least one recycle material hopper auger positioned below each of said dry hopper and recycle hopper respectively, a dry material accumulator chamber and a recycle material accumulator chamber positioned respectively below each said hopper and each said accumulator chamber being provided with a plurality of rotatable mixers, and a flow stabilizer positioned below said accumulator chamber in material communication therewith and said pneumatic transport therebelow for receiving and mixing said material prior to entering said pneumatic transport.

17. The apparatus of claim 1 including, said hoppers including both a dry material hopper and a recycle material hopper, a plurality of augers positioned below said hoppers, at least one dry material hopper auger and at least one recycle material hopper auger positioned below each of said dry hopper and recycle hopper respectively, a dry material accumulator chamber and a recycle material accumulator chamber positioned respectively below each said hopper and each said accumulator chamber being provided with a plurality of rotatable mixers, a flow stabilizer positioned below said accumulator chamber in material communication therewith and said pneumatic transport therebelow for receiving and mixing said material prior to entering said pneumatic transport, and said flow stabilizer having at least a pair of rotating bars with each said bar having mutually meshing fingers extending outwardly relative the rotational axes of said bars.

18. The apparatus of claim 1 including, said hoppers including both a dry material hopper and a recycle material hopper, a plurality of augers positioned below said hoppers, at least one dry material hopper auger and at least one recycle material hopper auger positioned below each of said dry hopper and recycle hopper respectively, a dry material accumulator chamber and a recycle material accumulator chamber positioned respectively below each said hopper and each said accumulator chamber being provided with a plurality of rotatable mixers, a flow stabilizer positioned below said accumulator chamber in material communication therewith and said pneumatic transport therebelow for receiving and mixing said material prior to entering said pneumatic transport, said flow stabilizer having at least a pair of rotating bars with each said bar having mutually meshing fingers extending outwardly relative the rotational axes of said bars, a plurality of augers positioned below said hoppers, and a variable opening positioned between both said dry material accumulator chamber and said recycle material accumulator for controlled material communication between said accumulator chambers and said flow stabilizer.

19. The apparatus of claim 1 including, said hoppers including both a dry material hopper and a recycle material hopper, a plurality of augers positioned below said hoppers, at least one dry material hopper auger and at least one recycle material hopper auger positioned below each of said dry hopper and recycle hopper respectively, a dry material accumulator chamber and a recycle material accumulator chamber positioned respectively below each said hopper and each said accumulator chamber being provided with a plurality of rotatable mixers, and a first metering slot communicating the dry material hopper auger with the dry material accumulator chamber therebelow and a second metering slot communicating the recycle material hopper auger with the recycle material accumulator, and a flow stabilizer positioned below said accumulator chamber in material communication therewith and said pneumatic transport therebelow for receiving and mixing said material prior to entering said pneumatic transport.

20. The apparatus of claim 1 including, said hoppers including both a dry material hopper and a recycle material hopper, a plurality of augers positioned below said hoppers, at least one dry material hopper auger and at least one recycle material hopper auger positioned below each of said dry hopper and recycle hopper respectively, a dry material accumulator chamber and a recycle material accumulator chamber positioned respectively below each said hopper and each said accumulator chamber being provided with a plurality of rotatable mixers, a first metering slot communicating the dry material hopper auger with the dry material accumulator chamber therebelow and a second metering slot communicating the recycle material hopper auger with the recycle material accumulator, a flow stabilizer positioned below said accumulator chamber in material communication therewith and said pneumatic transport therebelow for receiving and mixing said material prior to entering said pneumatic transport, said flow stabilizer having at least a pair of rotating bars with each said bar having mutually meshing fingers extending outwardly relative to the rotational axes of said bars, a plurality of augers positioned below said hoppers, a variable opening positioned between both said dry material accumulator chamber and said recycle material accumulator for controlled material communication between said accumulator chambers and said flow stabilizer, and said variable opening being a movable slide that selectively controls the flow of dry material and recycle material from their respective accumulator chambers into the flow stabilizer.

21. The apparatus of claim 19 including, said flow stabilizer having at least a pair of rotating bars with each said bar having mutually meshing fingers extending outwardly relative to the rotational axes of said bars, and said rotating bars rotating in opposite direction to propel said material into said pneumatic transport.

22. The apparatus of claim 11 including, said flow stabilizer having at least a pair of rotating bars with each said bar having mutually meshing fingers extending outwardly relative to the rotational axes of said bars, and each of said rotating bars receiving said dry material and said recycle material respectively through said variable opening.

23. The apparatus of claim 1 including, said pneumatic transport being a double drum air lock feeder.

24. The apparatus of claim 2 including, a trough positioned longitudinally below each of said augers to support said material during said conveyance.

25. The apparatus of claim 24 including, the trough beneath the auger for the recycle material being of shorter length than the trough beneath the dry material to form a larger metering slot for the recycle material to pass through into the accumulator chamber.

26. An insulation material spraying apparatus comprising:

a hopper for receiving dry material and a hopper for receiving wet recycle material, conveying means for receiving and conveying said material, a blender positioned below said hopper and said conveying means for combining said dry material and said wet recycle material to form a moist mixture, a pneumatic transport for receiving said moist mixture and dispensing said mixed material.

27. The apparatus of claim 26 comprising:

said blender being a flow stabilizer and combiner of said dry material and said wet recycle material to form said moist mixture and being provided with at least a pair of rotating bars with each said bar having mutually meshing fingers extending outwardly relative to the rotational axes of said bars.

28. The apparatus of claim 27 including, said conveying means being at least one auger rotatably positioned below each said hopper for receiving said material for conveyance longitudinally of said auger.

29. The apparatus of claim 28 including, an accumulator chamber positioned below said auger for receiving said material, and said accumulator chamber containing at least one mixer rotatable about an axis and having a plurality of contacts extending outwardly relative to said axis for mixing and expanding the volume of said material.

30. The apparatus of claim 29 including, a variable opening positioned between both said dry material accumulator chamber and said recycle material accumulator for controlled material communication between said accumulator chambers and said flow stabilizer.

31. The apparatus of claim 26 including, a centrifugal vacuum fan for feeding said wet recycle material to said recycle material hopper, said vacuum fan having a drive shaft for rotating said vacuum fan, a plurality of fan blades each having a leading edge and a root, said blades being secured to said shaft at the root of each of said blades distal to upstream of the flow of material and the leading edge of said blades, each said blade being cut away between the leading edge of said blade and said root to form a blade throat with a suction area, and said leading blade edge extending beyond the end of the shaft to increase the suction area.

32. The apparatus of claim 31 including, said shaft having a leading end, said leading and being provided with a conical shape.

33. The apparatus of claim 31 including, said vacuum fan having a circular inlet and an inlet area, the root of said blades having a root area transverse to the axis of said drive shaft, said inlet area and said root area being in the ratio of approximately about 6:1.

34. The apparatus of claim 31 including, the leading edge of each said blade having a straight section extending toward said root in one direction and toward the inlet in the other direction.

35. The apparatus of claim 34 including, said straight section being approximately about 75% to 92.5% of the width of said blade.

36. The apparatus of claim 34 including, said straight section extending downstream toward said root to form a transition point positioned approximately at about 40% of the diameter of said blade throat.

37. The process of spraying a mixture of dry material and wet recycle material from a single pneumatic transport comprising:

providing a dry material hopper and a wet recycle hopper containing dry material and recycle material respectively, separately conveying said dry and wet recycle materials to an accumulator chamber, separately mixing and expanding the volume of said dry and wet recycle materials, mixing said dry material and said wet recycle material together, directing said mixture of said dry material and said wet recycle material into a pneumatic transport, and dispensing and spraying said mixture therefrom.

38. The process of claim 37 including, controlling the individual flows of said dry material and said wet recycle materials into a flow stabilizer prior to said mixing.

39. The process of claim 37 including, retrieving by vacuuming previously sprayed material to form said wet recycle material and transporting said recycle material by vacuum into said recycle hopper.

40. The process of claim 37 including, controlling the individual flows of said dry material and said wet recycle materials into a flow stabilizer prior to said mixing, and retrieving by vacuuming previously sprayed material to form said wet recycle material and transporting said recycle material by vacuum into said recycle hopper.

\* \* \* \* \*